United States Patent Office 3,307,931
Patented Mar. 7, 1967

3,307,931
HERBICIDAL COMPOSITION AND METHOD
Victor H. Unger, Willow Grove, and Robert E. Wolfrom, Jenkintown, Pa., assignors to Rohm & Haas Company, Philadelphia, Pa., a corporation of Delaware
No Drawing. Filed May 3, 1965, Ser. No. 452,902
14 Claims. (Cl. 71—2.2)

This application is a continuation-in-part of United States application Serial No. 422,502, filed December 31, 1964, now abandoned.

This invention is concerned with improved herbicidal compositions.

This invention describes novel synergistic herbicidal compositions having a total herbicidal activity which is greater than that which is predictable from the activity of its individual components.

It has been discovered that a variety of herbicides, when formulated into herbicidal compositions, in accordance with the teachings of this invention, are markedly improved in activity. Such improvements are advantageous to the user of herbicides in allowing a reduction in total amount of herbicide employed in a given situation.

By this invention, the user is able to reduce the amount of herbicide required for a desired level of control and often to eliminate the necessity for a repeat application, as a result of more effective control in the initial spray. As a consequence, an economic advantage ensues and the potential dangers from herbicide residues in soil where crops are grown for man or animal are thereby lessened. Another advantage of this invention is that combinations described provide more rapid kill of noxious weeds and thereby minimize the chance of failure owing to herbicide removal by weathering forces soon after treatments are applied. In certain instances, it is also possible to enhance the selective characteristics of the herbicide.

The formulations of this invention involve three essential components which may be divided into three groups:

Group A—Herbicidal toxicants.—These include:
(a) Arsenic-containing herbicides exemplified by disodium methanearsonate (DSMA), monosodium methanearsonate (MSMA), sodium arsenate ($Na_2HAsO_3$) and sodium arsenite ($NaAsO_2$);
(b) Chlorinated aliphatic acids and their salts, such as dalapon and trichloroacetic acid and their sodium salts;
(c) Inorganic chlorates, such as magnesium, potassium and sodium chlorates;
(d) Endothal, 7-oxabicyclo [2,2,1] heptane-2,3-dicarboxylic acid and its disodium salt;
(e) Dipyridylium salts, such as the dibromide of diquat, 1,1'-ethylene-2,2'-dipyridylium dibromide and the dichloride of paraquat, 1,1'-dimethyl-4,4'-dipyridylium dichloride;
(f) Urea type herbicides, such as monuron, N'-(4-chlorophenyl)-N,N-dimethylurea, and diuron, N'-(3,4-dichlorophenyl)-N,N-dimethylurea;
(g) Sym-triazine type herbicides, such as atrazine, 2-chloro-4-ethylamino-6-isopropylamino-1,3,5-triazine, propazine, 2-chloro-4,6-bisisopropylamino-1,3,5-triazine, and simazine, 2-chloro-4,6-bisethylamino-1,3,5-triazine.
(h) Salts of chlorinated-phenoxyacetic acid type herbicides such as alkali metal and amine salts of 2,4-dichlorophenoxyacetic acid, 2,4,5-trichlorophenoxyacetic acid and 2-methyl-4-chlorophenoxyacetic acid, and
(i) Sodium pentachlorophenate.

Group B—Surfactants.—The surfactants which have been found useful in this invention are surface-active agents, which are often used in the field of agricultural and sanitary chemicals as detergents, dispersing agents, emulsifying agents, penetrants, wetting agents and the like. Reference to specific surface-active agents may be found in an annual publication by J. W. McCutcheon, Detergents and Emulsifiers, John W. McCutcheon, Inc., Morristown, New Jersey, 1964. Those surfactants which are operative in this invention are found in the following groups:

(a) Non-ionic surface-active agents exemplified by octyl- and nonylphenoxypolyethoxyethanol containing a total of 6 to 20 ethoxy units. These surfactants are commercially available under such proprietary names as Triton (reg. trademark) N–101, Triton X–100, Triton X–102, Triton X–114 and Triton X–165;

(b) Anionic surfactants exemplified by alkali metal salts of octylphenoxyethyl sulfate and octylphenoxypolyethoxyethyl sulfate wherein there is a total of 2 to 6 ethoxy units. Such products are obtainable under the proprietary names of Triton W–30, Triton 770, Alipal CO–433 and Alipal EO–526;

(c) Anionic surfactants exemplified by water-soluble salts of alkylbenzenesulfonic acid wherein the alkyl group contains 8 to 16 carbon atoms. Such surfactants are exemplified by sodium octylbenzenesulfonate, sodium dodecylbenzenesulfonate, triethanolamine salt of dodecylbenzenesulfonate and ammonium hexadecylbenzenesulfonate, and are available under such proprietary names as Conco BOD–200 or BOD–300 and Ultrawet DS;

(d) Amphoteric surfactants as represented by alkali metal salts of substituted quaternary hydroxy cyclo-imidinic acid metal alcoholates as described in United States Patent No. 2,528,378 and commercially available under the proprietary name, Miranol (reg. trademark). For example, Miranol C2M is:

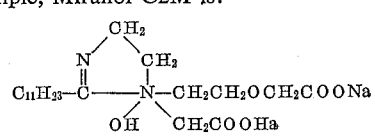

Group C—Hydrotropes.—Hydrotropes are well-known types of structures which may be defined as organic compounds having hydrophile-hydrophobe properties and are capable of increasing the solubility of other organic compounds or salts in water or aqueous salt solutions. They are most generally used to increase the salt content in built heavy-duty liquid detergents. Typical hydrotropes which are operative in this invention are given below and specific reference to them may be found in McCutcheon, cited above:

(a) Alkali metal and ammonium salts of benzene, toluene and xylenesulfonates, commercially available, for example, under the proprietary names of Ultra KXS and SXS and Trepolate (reg. trademark) ATS, KTS, STS, AXS, KXS and SXS;

(b) Sodium alkylnaphthalenesulfonate, commercially available, for example, under the proprietary name, Petro AA;

(c) Alkali metal salts of alkylphenoxypolyethoxyethylphosphoric acids of the formula:

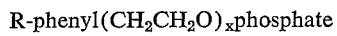

wherein R is hydrogen or alkyl of 1 to 12 carbon atoms, preferably 1 to 5, and x equals 1 to 20, preferably 3 to 8. Structures of this type and a method for producing them are disclosed by Richard C. Mansfield in his United States patent application No. 255,173, filed January 31, 1963, and the contents of that application are incorporated herein by reference;

(d) Tetrasodium N-(1,2-dicarboxyethyl)-N-octadecylsulfosuccinamate, commercially available under the proprietary name of Aerosol (reg. trademark) 22 and (e) Sodium salt of N-lauryl-β-iminodipropionate, commercially available under the proprietary name of Deriphat 160.

It is not known exactly in what manner the three component mixtures function to achieve the enhanced herbicidal activity or what principles are involved. At the moment, this can only be determined by experimentation. Suffice it to say, however, that certain combinations do exhibit synergized herbicidal properties whereas others, even closely related, do not, and the specific combinations of herbicides, surfactants and hydrotropes which will have these enhanced herbicidal properties are not predictable.

It is well-known that surfactants will increase the activity of some herbicides. Increased entry of the herbicide into the plant and improved contact and deposit of the herbicide on the leaf surface are possible explanations which have been studied. It is also known that in the ordinary use of surfactants in pesticidal sprays as wetting, spreading, dispersing, emulsifying, etc. agents, the amount of surfactant needed to achieve the maximum surface activity is considerably less than that required to produce enhanced herbicidal activity. Undoubtedly, a number of physical-chemical characteristics of tthe chemicals involved and of solutions and surfaces come into play. This invention goes beyond that which is known and enhancement of herbicidal activity greater than that from surfactant alone is achieved by a surfactant-hydrotrope combination.

The following examples illustrate this invention:

(A) EXAMPLES WITH MONOSODIUM METHANEARSONATE (MSMA)

Monosodium methanearsonate is available commercially as a 50.6% aqueous solution containing 6.6 lbs. of the active ingredient per gallon. An important use of MSMA is for selective weed control in cotton. It is particularly effective against grasses. The herbicidal action of MSMA is enhanced by addition of surfactant to the spray solution and, for this reason, it is accepted practice to recommend that MSMA be used with surfactant. For example, on the label for the 50.6% solution of MSMA sold under the proprietary name of Ansar 170, the recommendation is made that 1.5 to 2 quarts of a non-ionic surfactant be added with 3 pints of Ansar 170 to 50 gallons of water.

*Example 1.—Spray mixtures made with MSMA plus the hydrotrope dipotassium cresoxytetraethoxyethyl phosphate and a variety of surfactants*

The following compositions were made up as spray mixtures in an amount which corresponds to the use of 50 gallons of spray per acre. This is in the range recommended in the field. For convenience, the surfactants used are numbered as follows:

TABLE I.—TABLE OF SURFACTANTS

Surfactant:                 Identity

I          Octylphenoxy(ethoxy)$_{6.5}$ethanol.

II        Sodium octylphenoxydiethoxyethyl sulfate (30% solution).

III       Sodium dodecylbenzenesulfonate known as ULTRAWET 60L (60% solution).

IV       Disodium salt of 1-β-(carboxymethoxy) ethyl-1-carboxymethyl-2-undecyl-2-imidazolinium hydroxide known as MIRANOL C2M conc. (38% solution).

V         Octylphenoxytetraethoxyethanol.

VI        Octylphenoxy(ethoxy)$_{39}$ethanol.

VII      Sodium lauryl sulfate—a 30% paste known as DUPONOL WA.

VIII     Lauric diethanolamide—an 87% solution known as ALROSOL.

IX       Octylphenoxy(ethoxy)$_{15}$ethanol (70%-solution).

TABLE II.—COMPOSITIONS OF MSMA WITH SEVERAL SURFACTANTS AND HYDROTROPE I

| Composition | Amounts (Per 50 Gallons of Spray) of— | | | |
|---|---|---|---|---|
| | MSMA, 6.6 Lbs. Active/Gal., Pints | Dipotassium Cresoxy-tetraethoxyethyl Phosphate 50% Aqueous Solution, Hydrotrope I, Pints | Surfactant [1] | |
| | | | Kind | Pints |
| A | 3 | | | |
| B | 3 | 4 | | |
| C | 3 | | I | 2 |
| D | 3 | 2 | I | 1 |
| E | 3 | | II | 2 |
| F | 3 | 2 | II | 1 |
| G | 3 | | III | 2 |
| H | 3 | 2 | III | 1 |
| J | 3 | | IV | 2 |
| K | 3 | 2 | IV | 1 |
| L | 3 | | V | 2 |
| M | 3 | 2 | V | 1 |
| N | 3 | | VI | 2 |
| O | 3 | 2 | VI | 1 |
| P | 3 | | VII | 2 |
| Q | 3 | 2 | VII | 1 |
| R | 3 | | VIII | 2 |
| S | 3 | 2 | VIII | 1 |
| T | 2 | 6 | | |
| U | 2 | | IX | 4.3 |
| V | 2 | 3 | IX | 2.15 |
| W | 2 | | I | 3 |
| X | 2 | 3 | I | 1.5 |

[1] See Table I.

Compositions A–S were applied to crabgrass (Digitaria spp.) which was 13 and 22 days old and Compositions T–X were applied to 20-day old crabgrass. A rate of 50 gallons per acre was uniformly applied with a conventional low pressure (26 p.s.i.) herbicide sprayer so that a dosage of about 2.47 lbs. of MSMA per acre was applied in all cases. Thirteen days later, the percent control of the crabgrass in comparison with untreated plots was determined. Compositions T–X were applied to 20-day old crabgrass at a dosage of 1.65 lbs. of MSMA in 50 gallons of spray per acre. Seven days later, the percent control of the crabgrass was determined. The following results were obtained:

TABLE III.—CRABGRASS CONTROL WITH MSMA FORMULATIONS

| Treatments With Composition | Percent Crabgrass Control (Age of Crabgrass) | | |
|---|---|---|---|
| | 13 Days | 20 Days | 22 Days |
| B | 50 | | 55 |
| C | 50 | | 70 |
| D | 83 | | 95 |
| Expected control for D | 50 | | 63 |
| B | 50 | | 55 |
| E | 65 | | 80 |
| F | 73 | | 85 |
| Expected control for F | 58 | | 68 |
| B | 50 | | 55 |
| G | 63 | | 80 |
| H | 75 | | 90 |
| Expected control for H | 57 | | 68 |
| B | 50 | | 55 |
| J | 53 | | 65 |
| K | 58 | | 80 |
| Expected control for K | 52 | | 60 |
| B | 50 | | 55 |
| L | 45 | | 60 |
| M | 50 | | 60 |
| B | 50 | | 55 |
| N | 60 | | 70 |
| O | 63 | | 70 |
| B | 50 | | 55 |
| P | 80 | | 85 |
| Q | 70 | | 80 |
| B | 50 | | |
| R | 58 | | |
| S | 55 | | |
| T | | 45 | |
| U | | 65 | |
| V | | 70 | |
| Expected control for V | | 55 | |
| T | | 45 | |
| W | | 75 | |
| X | | 85 | |
| Expected control for X | | 60 | |

The expected values for surfactant-hydrotrope combinations are determined by graphing percent control responses for the herbicide with surfactant alone and for the herbicide with hydrotrope alone. The line connecting these two responses represents the expected additive values for all combinations of surfactant plus hydrotrope which develop from replacing a percentage decrease in the one component with a corresponding percentage increase in the other. For example, when MSMA is tested with 6 pints of Hydrotrope I and 3 pints of Surfactant IX, the combination of 3 pints of Hydrotrope I and 1.5 pints of Surfactant IX represents the combination of 50% of each component. All combinations which total 100% should provide weed control in the vicinity of the expected values derived from the line which connects herbicide plus 100% surfactant with herbicide plus 100% hydrotrope. Combinations which give percent control values falling above the line are synergistic, on or near the line are additive, and below the line antagonistic. Under the conditions of the test procedures used to study combinations described herein, a deviation of more than 10% control from the additivity or expected value line is considered significant synergism or antagonism. This procedure is commonly used in a variety of bioassays. It is taken from a method proposed by Bliss, as modified by Horsfall, and described in Methods of Testing Chemicals on Insects, edited by H. H. Shepard (Burgess Publishing Company, Minneapolis, Minn., 1958), vol. I, pp. 319–320.

From these tables, it will be seen that in order to apply approximately 2.47 lbs. of MSMA per acre, one would use:

Composition B at 7 pints/50 gal./acre and this contains 3 pints of MSMA and 4 pints of the hydrotrope;

Compositions C, E, G, J, L, N, P and R at 5 pints/50 gal./acre and these contain 3 pints of MSMA and 2 pints of the surfactant; and Compositions D, F, H, K, M, O, Q and S at 6 pints/50 gal./acre and these contain 3 pints of MSMA, 2 pints of the hydrotrope and 1 pint of the surfactant.

The total amount of MSMA applied per acre is the same in all cases. The total amount of hydrotrope supplied in Compositions D, F, H, K, M, O, Q and S is just one-half that of Composition B and the total amount of surfactant in these same compositions is just one-half that of Compositions C, E, G, J, L, N, P and R. A similar relationship applies to Compositions T to X.

These data show definitely that combinations of dipotassium cresoxytetraethoxyethyl phosphate (Hydrotrope I) with the following surfactants:

Octylphenoxy(ethoxy)$_{6.5}$ethanol (Composition D),

Sodium octylphenoxydiethoxyethyl sulfate (Composition F),

Sodium dodecylbenzenesulfonate (Composition H),

Disodium salt of 1-$\beta$-(carboxymethoxy)ethyl-1-carboxymethyl-2-undecyl-2-imidazolinium hydroxide (Composition H) and Octylphenoxy(ethoxy)$_{15}$ethanol (Composition V) provide more than the additive herbicidal activity than could be predicted from Hydrotrope I or the individual surfactants used separately with MSMA.

On the other hand, when dipotassium cresoxytetraethoxyethyl phosphate (Hydrotrope I) is combined with the surfactants:

Octylphenoxytetraethoxyethanol (Composition M),

Octylphenoxy(ethoxy)$_{39}$ethanol (Composition O),

Sodium lauryl sulfate (Composition Q) and

Lauric diethanolamide (Composition S), the resulting herbicidal activity is not significantly greater than that which could be expected based on the use of Hydrotrope I or these surfactants employed individually with the MSMA.

*Example 2.—Spray mixtures made with MSMA plus octylphenoxy(ethoxy)$_{6.5}$ethanol (Surfactant I) and a variety of hydrotropes*

In order to determine the types of hydrotropes which produce the enhanced herbicidal effects when combined with surfactants, compositions were evaluated on crabgrass using MSMA at the recommended dosage per acre and Surfactant I combined with the hydrotropes given in Table IV:

TABLE IV.—TABLE OF HYDROTROPES

| Hydrotrope: | Identity |
|---|---|
| I | Dipotassium cresoxytetraethoxyethyl phosphate (50%). |
| II | Sodium xylenesulfonate, 43% (Ultra SXS). |
| III | Sodium xylenesulfonate, 43% (Ultra SXS). (Petro AA). |
| IV | Tetrasodium N - (1,2 - dicarboxyethyl) - N-octadecylsulfosuccinamate, 35% (Aerosol 22). |
| V | Disodium N - lauryl - $\beta$-iminodipropionate, 100% (Deriphat 160). |

The compositions were prepared as given in Table V below:

TABLE V.—COMPOSITIONS WITH MSMA WITH SEVERAL HYDROTROPES AND SURFACTANT I

| Composition | Amounts Per 50 Gallons of Spray Per Acre | | | | |
|---|---|---|---|---|---|
| | MSMA, 6.6 lbs. active/ Gal. Pints | Hydrotrope | | Surfactant | |
| | | Kind | Amount | Kind | Pints |
| A-1 | 3 | | | | |
| B-1 | 3 | | | I | 3 |
| C-1 | 3 | I | 6 pints | | |
| D-1 | 3 | I | 3 pints | I | 1.5 |
| E-1 | 3 | II | 6 pints | | |
| F-1 | 3 | II | 3 pints | I | 1.5 |
| G-1 | 3 | III | 3 lbs | | |
| H-1 | 3 | III | 1.5 lbs | I | 1.5 |
| J-1 | 3 | IV | 6 pints | | |
| K-1 | 3 | IV | 3 pints | I | 1.5 |
| L-1 | 3 | V | 3 lbs | | |
| M-1 | 3 | V | 1.5 lbs | I | 1.5 |

The compositions listed in Table V were applied to crabgrass that was 20 and 27 days old. A rate of 50 gallons per acre was uniformly used so that a dosage of about 2.47 lbs. of MSMA per acre was applied in all cases. Eleven days later, the percent control of the crabgrass in comparison with untreated plots was determined. The results are given in Table VI.

TABLE VI.—CRABGRASS CONTROL WITH MSMA COMPOSITIONS

| Treatments With Composition | Percent Crabgrass Control (Age of Crabgrass) | |
|---|---|---|
| | 20 Days | 27 Days |
| B-1 | 58 | 60 |
| C-1 | 60 | |
| D-1 | 83 | 90 |
| Expected control for D-1 | 59 | |
| E-1 | 55 | 50 |
| F-1 | 68 | 70 |
| Expected control for F-1 | 57 | 55 |
| G-1 | 58 | |
| H-1 | 75 | |
| Expected control for H-1 | 58 | |
| J-1 | 58 | 70 |
| K-1 | 83 | 80 |
| Expected control for K-1 | 58 | 65 |
| L-1 | 83 | 60 |
| M-1 | 88 | 90 |
| Expected control for M-1 | 71 | 60 |

It may be concluded from Table VI that in the case of all five hydrotropes, the herbicidal activity has been enhanced over that which is calculated on the basis of formulations with equivalent amounts of MSMA and the individual hydrotropes and surfactants alone. Thus, synergism has been exhibited when monosodium methanearsonate is applied with a non-ionic surfactant and with designated types of hydrotropes, of which some are anionic (for example, Hydrotropes I-IV) and some are amphoteric (for example, Hydrotrope V).

*Example 3.—Spray mixtures with MSMA containing various ratios of hydrotrope to surfactant and various amounts of the combination*

In Examples 1 and 2, above, synergistic responses were obtained when the ratio of hydrotrope product to surfactant product was held constant at 2 parts hydrotrope to 1 part of surfactant. In Example 1, 2 pints of hydrotrope and 1 pint of surfactant were applied per acre. In Example 2, 3 pints of hydrotrope and 1½ pints of surfactant were applied per acre. Experiments were conducted to determine whether or not a synergistic response can result from a wide range of hydrotrope to surfactant ratios applied at varying amounts of the combinations per acre.

The compositions given in Table VII were applied in the equivalent of 50 gallons of water per acre to 20-day old crabgrass. The percent of crabgrass control after 5 days was determined. The results are given in Table VIII. Expected values were determined from graphs of the values obtained with the compositions involving the surfactant and the hydrotrope used alone with the MSMA toxicant and are included in Table VIII.

TABLE VII.—COMPOSITIONS WITH MSMA WITH VARYING AMOUNTS AND RATIOS OF SURFACTANT I AND HYDROTROPE I

| Composition | Amounts (In Pints/50 Gallons of Spray) of— | | |
|---|---|---|---|
| | MSMA, 6.6 Lbs. Active/Gal. | Surfactant I | Hydrotrope I |
| A | 3 | | |
| AB | 3 | 1 | |
| AC | 3 | | 1 |
| AD | 3 | 0.2 | 0.8 |
| AE | 3 | 0.5 | 0.5 |
| AF | 3 | 0.8 | 0.2 |
| AG | 3 | 2 | |
| AH | 3 | | 2 |
| AJ | 3 | 0.4 | 1.6 |
| AK | 3 | 1 | 1 |
| AL | 3 | 1.6 | 0.4 |
| B | 3 | | |
| AM | 3 | | 4 |
| AN | 3 | 0.8 | 3.2 |
| AO | 3 | 2 | 2 |
| AP | 3 | 3.2 | 0.8 |
| AQ | 3 | 8 | |
| AR | 3 | | 8 |
| AS | 3 | 1.6 | 6.4 |
| AT | 3 | 4 | 4 |
| AU | 3 | 6.4 | 1.6 |
| AV | 3 | 16 | |
| AW | 3 | | 16 |
| AX | 3 | 3.2 | 12.8 |
| AY | 3 | 8 | 8 |
| AZ | 3 | 12.8 | 3.2 |

TABLE VIII.—CRABGRASS CONTROL WITH MSMA COMPOSITIONS

| Treatments With Composition | Percent Crabgrass Control | |
|---|---|---|
| | Found | Expected |
| A | 20 | |
| AB | 40 | |
| AC | 20 | |
| AD | 40 | 24 |
| AE | 43 | 30 |
| AF | 45 | 37 |
| AG | 45 | |
| AH | 25 | |
| AJ | 60 | 28 |
| AK | 60 | 35 |
| AL | 55 | 40 |
| B | 55 | |
| AM | 30 | |
| AN | 70 | 35 |
| AO | 65 | 43 |
| AP | 63 | 50 |
| AQ | 55 | |
| AR | 43 | |
| AS | 75 | 46 |
| AT | 73 | 49 |
| AU | 68 | 53 |
| AV | 63 | |
| AW | 45 | |
| AX | 80 | 48 |
| AY | 80 | 54 |
| AZ | 78 | 60 |

The results given in Table VIII clearly demonstrate that surfactant to hydrotrope ratios of 4:1, 1:1 and 1:4 enhance the herbicidal effectiveness of monosodium methanearsonate to a greater degree than would be expected from the results of hydrotrope or surfactant applied alone with the MSMA. This conclusion is applicable to hydrotrope plus surfactant combinations ranging in total volume from 1 to 16 pints per acre.

Similar results are obtainable with disodium methanearsonate.

*Example 4.—Preparation of a stable formulation containing herbicide plus the synergistic surfactant plus hydrotrope combination*

The herbicide, hydrotrope, surfactant components which enter into the synergistic combinations of this invention may be added to the spray tank individually and in any given order. It is advantageous because of greater convenience for the user to provide a product containing all three components in a single package. A desirable requisite for a single package formulation is that all components be mutually compatible so that the resulting product be a stable, homogeneous mixture.

Formulations containing MSMA and synergistic hydrotrope plus surfactant combinations which synergize the activity of this herbicide have been prepared which possess the desired physical stability characteristic. The following are given as examples:

| | MSMA (50.6% Solution) Parts by Volume | Hydrotrope I, Surfactant I Blend, Parts by Volume | Volume Ratio of Hydrotrope I to Surfactant I |
|---|---|---|---|
| a | 60 | 40 | 4:1 |
| b | 60 | 40 | 6:1 |
| c | 50 | 50 | 4:1 |
| d | 40 | 60 | 4:1 |

It has also been found that for an amount of herbicide, such as monosodium methanearsonate, which is applied to an acre of land to give the desired weed control, the synergistic effect or enhancement of activity described in this invention is obtained by the presence of 0.5 pint to 20 pints per acre of a hydrotrope-surfactant mixture in which the volume ratio of hydrotrope to surfactant is in the range of 10:1 to 1:10. The preferred amount of the hydrotrope-surfactant mixture to add to an amount of herbicidal toxicant for weed control on one acre of area is in the range of 1 to 8 pints. The preferred ratios of hydrotrope to surfactant in the mixture are in the range of 6:1 to 1:4.

(B) EXAMPLES WITH OTHER HERBICIDES

*Example 5.—Formulations made with sodium arsenite*

Sodium arsenate and sodium arsenite are commercial herbicides that are used for soil sterilization, for aquatic weed control, for vine killing, legume foliage desiccation and other specialized uses. Since arsenicals are notorious as poisons, it is advantageous to be able to reduce the amount of the arsenical applied so as to prevent poisoning the soil with arsenic as much as possible.

In determining whether or not the herbicidal action of alkali metal salts of arsenous and arsenic acids could be enhanced more by combinations of surfactants and hydrotropes than by either alone, formulations of sodium arsenite (71.4% solution) were made with Surfactant I and Hydrotrope I and evaluated for their effect on young bean plants. In this test, the various formulations were applied as aqueous sprays to potted bush bean plants that were 14 days old. Eleven days after treatment, the percent desiccation to the bean plants, as measured by foliage injury, was determined by comparison with untreated plants. The formulations used and the results are given in Table IX.

TABLE IX.—ENHANCEMENT OF HERBICIDAL ACTIVITY OF SODIUM ARSENITE

| | Formulation Applied in 50 Gallons of Spray per Acre | Percent Bean Injury |
|---|---|---|
| a | Sodium arsenite (71.4%), 4 pints | 80 |
| b | Sodium arsenite (71.4%), 4 pints<br>Plus Surfactant I, 3 pints | 83 |
| c | Sodium arsenite (71.4%), 4 pints<br>Plus Hydrotrope I, 6 pints | 78 |
| d | Sodium arsenite (71.4%), 4 pints<br>Plus Surfactant I, 1.5 pints<br>Plus Hydrotrope I, 3 pints | 97 |
| | Expected injury for formulation d | 81 |

It is seen that in the case of sodium arsenite, neither the surfactant alone nor the hydrotrope alone produced an enhanced herbicidal effect, whereas the combination of the two produced an unexpectedly large enhancement. The same type of effect is produced with sodium arsenate.

Example 6.—Formulations made with dalapon

There are several chlorinated acids and their water-soluble salts which have achieved some prominence as commercial herbicides. These materials are particularly useful for the control of annual and perennial noxious grasses as, for example, Johnsongrass (*Sorghum halepense*), quackgrass (*Agropyron repens*), foxtail (*Setaria glauca*) and crabgrass. The materials may be applied directly to the weed foliage or to the soil by pre-emergence applications. There are also uses involving selective seedling grass control in tolerant crops, such as beets, cabbage, potatoes and fruit orchards. The materials may also be used as temporary soil sterilants. The parent acids in this class of herbicides include trichloroacetic acid (commonly known as TCA), 2,2-dichloropropionic acid (known by the common name of dalapon), 2,2,3-trichloropropionic acid and 2,3-dichloroisobutyric acid.

In order to determine whether or not the principle of utilizing a herbicide with a hydrotrope-surfactant combination would produce greater activity than that from the hydrotrope or surfactant alone with this type of material, formulations of dalapon with Surfactant I and Hydrotrope I were evaluated for the control of crabgrass and for phytotoxicity to tomato plants which were selected as an indicator specie for broad-leaf weed control. In this test, the various formulations were applied as aqueous sprays to 36 day old crabgrass and to about 4 week old tomato plants. Ten days after treatment, the percent injury was determined by comparison with untreated plants. The formulations used and the data obtained are given in Table X.

TABLE X.—ENHANCEMENT OF HERBICIDAL ACTIVITY OF DALAPON

| | Formulation Applied in 50 Gallons of Spray per Acre | Percent Injury | |
|---|---|---|---|
| | | Crabgrass | Tomatoes |
| a | Dalapon, 4 lbs | 30 | 60 |
| b | Dalapon, 4 lbs<br>Plus Surfactant I, 3 pints | 40 | 60 |
| c | Dalapon, 4 lbs<br>Plus Hydrotrope I, 4 pints | 30 | 60 |
| d | Dalapon, 4 lbs<br>Plus Surfactant I, 1.5 pints<br>Plus Hydrotrope I, 2 pints | 70 | 75 |
| | Expected injury for formulation d | 35 | 60 |

With either the surfactant or the hydrotrope alone, there is no increase in herbicidal activity over that when dalapon is used alone, whereas there is a definite synergistic enhancement of activity with the combination of hydrotrope and surfactant. These same observations apply to the alkali metal salts of dalapon and to trichloroacetic acid, 2,2,3-trichloropropionic acid and 2,3-dichloroisobutyric acid and their alkali metal salts.

Example 7.—Formulations made with sodium chlorate

Sodium chlorate is used as a temporary soil sterilant and as a vine killer and defoliant. Magnesium chlorate finds use in the defoliation of cotton.

In order to determine whether or not the herbicidal activity of the chlorates could be enhanced by surfactant-hydrotrope combinations, formulations of a 40% solution of sodium chlorate with Surfactant I and Hydrotrope I were evaluated on young bean plants. The method described for Example 5 was used. The formulations used and the results are given in Table XI:

TABLE XI.—ENHANCEMENT OF HERBICIDAL ACTIVITY OF SODIUM CHLORATE

| | Formulation Applied in 50 Gallons of Spray per Acre | Percent Bean Injury |
|---|---|---|
| a | Sodium chlorate (40%), 10 lbs | 57 |
| b | Sodium chlorate (40%), 10 lbs<br>Plus Surfactant I, 3 pints | 67 |
| c | Sodium chlorate (40%), 10 lbs<br>Plus Hydrotrope I, 6 pints | 57 |
| d | Sodium chlorate (40%), 10 lbs<br>Plus Surfactant I, 1.5 pints<br>Plus Hydrotrope I, 3 pints | 77 |
| | Expected injury for formulation d | 62 |

It is concluded that there is substantial increase in herbicidal activity with the hydrotrope-surfactant combination over that expected from the activities of these materials used alone with sodium chlorate. The same effect may be obtained with magnesium or potassium chlorate.

Example 8.—Formulations made with endothal

Endothal is the common name used for 3,6-endoxohexahydrophthalic acid. It is a pre-emergence herbicide and is also used as a defoliant and harvest aid, for example on cotton, flax, legumes, small grains, corn and grasses. It is often used as its disodium salt.

The effect of a surfactant-hydrotrope combination on the activity of endothal was examined by mixing a commercial emulsion concentrate containing 2 lbs. of endothal per gallon with Surfactant I, Hydrotrope I, and a combination of Hydrotrope I and Surfactant I and evaluating them for injury to young bean plants. The method was the same as that described for Example 5. The formulations used and the results are given in Table XII.

TABLE XII.—ENHANCEMENT OF HERBICIDAL ACTIVITY OF ENDOTHAL

| | Formulation Applied in 50 Gallons of Spray per Acre | Percent Bean Injury |
|---|---|---|
| a | Endothal (2 lbs./gal. EC), 2 pints | 37 |
| b | Endothal (2 lbs./gal. EC), 2 pints<br>Plus Surfactant I, 3 pints | 67 |
| c | Endothal (2 lbs./gal. EC), 2 pints<br>Plus Hydrotrope I, 6 pints | 63 |
| d | Endothal (2 lbs./gal. EC), 2 pints<br>Plus Surfactant I, 1.5 pints<br>Plus Hydrotrope I, 3 pints | 87 |
| | Expected injury for formulation d | 65 |

Although the activity of endothal is increased by the presence of the surfactant or the hydrotrope alone, with a combination of the two there is an unpredictably large enhancement. The same type of results are obtainable with the disodium salt of endothal.

Example 9.—Formulations made with diquat

Herbicides based on dipyridylium salts are very potent non-selective herbicides. They are particularly useful in controlling many weeds which are resistant to the 2,4-D type of herbicide. One of the best known herbicides in this class is 1,1'-ethylene-2,2'-dipyridylium dibromide, whose cation is known by the common name of diquat. 1,1'-dimethyl-4,4'-dipyridylium dichloride is an equally useful herbicide.

Spray mixtures of diquat (a 40% emulsion concentrate of the dibromide) were employed, in which Surfactant I and Hydrotrope I were incorporated. They were evaluated for the control of crabgrass by the method described in Example 6. The formulations used and the data obtained are given in Table XIII:

TABLE XIII.—ENHANCEMENT OF HERBICIDAL ACTIVITY OF DIQUAT

| | Formulation Applied in 50 Gallons of Spray/Acre | Percent Crabgrass Injury |
|---|---|---|
| a | Diquat (40% EC), 1 pint | 50 |
| b | Diquat (40% EC), 1 pint<br>Plus Surfactant I, 3 pints | 75 |
| c | Diquat (40% EC), 1 pint<br>Plus Hydrotrope I, 4 pints | 50 |
| d | Diquat (40% EC), 1 pint<br>Plus Surfactant I, 1.5 pints<br>Plus Hydrotrope I, 2 pints | 85 |
| | Expected injury for formulation d | 63 |

It is concluded that the herbicidal activity of diquat is substantially synergized by the hydrotrope-surfactant combinations. The same results are obtainable with paraquat.

*Example 10.—Formulations made with diuron*

Several substituted ureas have achieved prominence as herbicides. As a class, they are particularly useful for weed control of annual weeds in tolerant crops which include such prominent crops as cotton, sugar cane, pineapple and alfalfa. At higher dosages per acre, they become soil sterilants. This class of herbicides includes those known by the common names of diuron, fenuron, linuron, monuron and neburon.

As typical of this class of herbicides, diuron, N'-(3,4-dichlorophenyl)-N,N-dimethylurea, as an 80% wettable powder was selected for formulation with a surfactant-hydrotrope combination to determine whether or not its herbicidal activity was enhanced by the presence of these additives. For the evaluation of the formulations, seeds or barnyardgrass (*Echinochloa crusgalli*), foxtail (*Setaria glauca*) and wild oat (*Avena fatua*) were planted in pots and 16 days later were treated with aqueous sprays of the experimental formulations in an amount which would be used for one acre of land area in 50 gallons of spray. Twelve days after treatment, the percent weed control was determined by comparison with untreated plants. The formulations used and the data obtained are presented in Table XIV:

TABLE XIV.—ENHANCEMENT OF HERBICIDAL ACTIVITY OF DIURON

| | Formulation Applied in 50 Gallons of Spray Per Acre | Percent Weed Control | | |
|---|---|---|---|---|
| | | Barn-yard-grass | Fox-tail | Wild Oat |
| a | Diuron (80% WP), 1 lb | 10 | 60 | 10 |
| b | Diuron (80% WP), 1 lb<br>Plus Surfactant I, 1.8 pints | 50 | 90 | 55 |
| c | Diuron (80% WP), 1 lb<br>Plus Hydrotrope I, 3.6 pints | 40 | 90 | 30 |
| d | Diuron (80% WP), 1 lb<br>Plus Surfactant I, 0.9 pint<br>Plus Hydrotrope I, 1.8 pints | 60 | 100 | 70 |
| | Expected control for formulation d | 45 | 90 | 42 |

Although the herbicidal action of diuron is enhanced by the presence of a surfactant or a hydrotrope, the combination of hydrotrope-surfactant produced an unpredictable synergistic effect. This same effect is produced with the other common urea-type herbicides.

*Example 11.—Formulations made with atrazine*

A large class of herbicides which has recently come into prominence is derivatives of 1,3,5-triazine. These compounds are selective herbicides which are pre-emergently active on both monocotyledonous and dicotyledonous weeds and in some cases also possess post-emergence activity. They have been used for the control of weeds in corn, several legumes, cotton, tobacco and various other crops.

As typical of this class of herbicides, atrazine, 2-chloro-4-ethylamino-6-isopropylamino-1,3,5-triazine, was chosen for study. The atrazine used was in the form of an 80% wettable powder (WP–80). Seeds of crabgrass and barnyardgrass were planted and 18 days later the resulting grass plants were sprayed with atrazine and various combinations of it with Surfactant I and Hydrotrope I. Six days after treatment the amount of injury to the grasses was determined by comparison with untreated pots of plants. The formulations used and the results obtained are given in Table XV:

TABLE XV.—ENHANCEMENT OF HERBICIDAL ACTIVITY OF ATRAZINE

| | Formulation Applied in 50 Gallons of Spray Per Acre | Percent Weed Control | |
|---|---|---|---|
| | | Crabgrass | Barnyard Grass |
| a | Atrazine WP-80, 2.5 lbs | 0 | 50 |
| b | Atrazine WP-80, 2.5 lbs<br>Plus Surfactant I, 2 pints | 60 | 57 |
| c | Atrazine WP-80, 2.5 lbs<br>Plus Hydrotrope I, 8 pints | 33 | 60 |
| d | Atrazine WP-80, 2.5 lbs<br>Plus Surfactant I, 1 pint<br>Plus Hydrotrope I, 4 pints | 67 | 80 |
| | Expected control for formulation d | 47 | 59 |

It will be seen that even though the action of atrazine is enhanced by the presence of either the surfactant or the hydrotrope alone, there is an unpredictably large synergistic effect when the combination of the surfactant with the hydrotrope is used. This same effect is obtained with simazine and other herbicides of the triazine type.

*Example 12.—Formulations with sodium 2,4-dichlorophenoxyacetate*

Probably the best known of the selective herbicides are those based on the chlorinated-phenoxy aliphatic acids. For example, large quantities of 2,4-dichlorophenoxyacetic acid (2,4-D), 2-methyl-4-chlorophenoxyacetic acid (MCPA), 2,4,5-trichlorophenoxyacetic acid (2,4,5-T) and various derivatives of these are used for the control of weeds in grain and grass crops and for brush control.

In order to determine, whether or not, the activity of the 2,4-D type of herbicide was enhanced by a combination of surfactant and hydrotrope, the following evaluation was run. Seeds of the weed velvetleaf (*Abutilon theophrasti*) were planted and 22 days thereafter the resulting plants were treated with sodium 2,4-dichlorophenoxyacetate (hereinafter abbreviated, Sodium 2,4-D) alone and with various formulations of Surfactant I and Hydrotrope I. Six days later the foliage was harvested and the weight of four plants was determined. The reduction in the weight of the foliage treated with the formulations over that treated with Sodium 2,4-D alone was taken as a measure of increased herbicidal activity. Table XVI gives the results.

TABLE XVI.—ENHANCEMENT OF HERBICIDAL ACTIVITY OF SODIUM 2,4-D

| | Formulations Applied in 50 Gallons of Spray Per Acre | Fresh Weight of Foliage (g.) | Percent Reduction in Weight |
|---|---|---|---|
| a | Sodium 2,4-D, 0.05 lb | 4.45 | |
| b | Sodium 2,4-D, 0.05 lb<br>Plus Surfactant I, 1 pint | 2.66 | 40 |
| c | Sodium 2,4-D, 0.05 lb<br>Plus Hydrotrope I, 4 pints | 2.43 | 45 |
| d | Sodium 2,4-D, 0.05 lb<br>Plus Surfactant I, 0.5 pint<br>Plus Hydrotrope I, 2 pints | 1.66 | 63 |
| | Expected reduction in fresh weight for formulation d | | 43 |

Although the use of the surfactant or the hydrotrope alone enhanced the herbicidal activity of Sodium 2,4-D, the combination of the two greatly increased this activity over that which would be calculated. This same effect is obtained with alkali metal and amine salts of 2,4-D, MCPA and 2,4,5-T. The herbicidal properties of the 2,4-D type herbicides are synergized by the method of this invention.

*Example 13.—Formulations with sodium pentachlorophenate*

Pentachlorophenol and its salts are used as general herbicides, pre-harvest defoliants and as selective herbicides in tolerant crops.

Sodium pentachlorophenate (Sodium PCP) and formulations of it with Surfactant I and Hydrotrope I were sprayed on 21 day old crabgrass. Three days and 12 days thereafter the percent injury to the crabgrass was determined by comparison with untreated plants. The results are given in Table XVII.

TABLE XVII.—ENHANCEMENT OF HERBICIDAL ACTIVITY OF SODIUM PENTACHLOROPHENATE

| Formulations Applied in 50 Gallons of Spray Per Acre | | Percent Control of Crabgrass Days After Treatment | |
|---|---|---|---|
| | | 3 | 12 |
| a | Sodium PCP, 1 lb | 10 | 60 |
| b | Sodium PCP, 1 lb / Plus Surfactant I, 3 pints | 67 | 67 |
| c | Sodium PCP, 1 lb / Plus Hydrotrope I, 4 pints | 60 | 63 |
| d | Sodium PCP, 1 lb / Plus Surfactant I, 1.5 pints / Plus Hydrotrope I, 2 pints | 77 | 80 |
| | Expected control for formulation d | 64 | 65 |

There was considerable enhancement of the herbicidal activity of Sodium PCP with the use of a surfactant or a hydrotrope alone on crabgrass three days after treatment and slight improvement in the control of this weed twelve days after treatment. With the surfactant-hydrotrope combination there was an unpredictable large enhancement of activity.

There is thus provided by this invention a means whereby the activity of two general types of herbicides, based on solubility characteirstics, can be enhanced over that of the herbicide alone or over that often obtained when a surfactant is present with the herbicide. One of these types is the water-soluble herbicides. It is exemplified by arsenic-containing compounds, chlorinated aliphatic acids and their salts, chlorates, endothal and its salts, dipyridylium salts, salts of 2,4-dichlorophenoxyacetic acid and related 2,4-D type acids, salts of 2,3,6-trichlorophenylacetic acid, salts of chlorinated benzoic acids and related acids, salts of pentachlorophenol, and salts of 4-amino-3,5,6-trichloropicolinic acid. The other general type is represented by the highly water-insoluble herbicides, that is those which customarily are formulated as wettable powders or emulsifiable concentrates. This type is exemplified by the herbicidal ureas; the herbicidal triaznies known by such common names as atrazine, chlorazine, ipazine, prometryne, propazine, simazine and trietazine; 1-phenyl-4-amino-5-chloropyridazone-6, and esters and water-insoluble amine salts of 2,4-D type herbicides.

The synergized herbicidal activity of this invention is obtained by incorporating with the herbicide, either as a prepared formulation or by admixing in the spray tank, a surfactant and a hydrotrope. It is convenient to express the proportions of the three essential ingredients on the basis of amounts used for weed control per acre of area. Accordingly, to an amount of herbicide used per acre to achieve a desired herbicidal effect there is added from one-half pint to twenty pints, based on 100% active ingredient, of a hydrotrope-surfactant mixture in which the ratio of the volumes of hydrotrope to surfactant is from 10:1 to 1:10. The preferred amount of the hydrotrope-surfactant combination to add to the herbicidal toxicant used per acre is in the range of one pint to eight pints, based on a purity of the hydrotrope and the surfactant as 100%. The preferred volume ratio of the hydrotrope to the surfactant in this combination is 6:1 to 1:4. In actual use the herbicide, hydrotrope and surfactant would ordinarily be incorporated in an inert carrier, such as water in the case of an aqueous spray or a solid diluent such as clays when used in the form of a dust or a granular herbicide, and when applied at appropriate rates and dosages to the area where weed control is desired.

By means of the enhanced herbicidal activity achieved by the compositions and methods of this invention, the agriculturalist, horticulturalist, and users of herbicides in general are able to use these herbicides more economically and more efficiently.

We claim:

1. A herbicidal composition comprising a herbicide present in an amount per acre to achieve a desired control of weeds, in combination with a hydrotrope and a surfactant wherein the hydrotrope-surfactant combination is present in the amount of one half pint to twenty pints and in which the volume ratio of hydrotrope to surfactant is in the range of 10:1 to 1:10, wherein said herbicide is selected from the group consisting of (1) monosodium methanearsonate,
(2) disodium methanearsonate,
(3) sodium arsenate,
(4) sodium arsenite,
(5) 2,2-dichloropropionic acid and its alkali metal salts,
(6) trichloroacetic acid and its alkali metal salts,
(7) 2,2,3-trichloropropionic acid and its alkali metal salts,
(8) 2,3-dichloroisobutyric acid and its alkali metal salts,
(9) magnesium chlorate,
(10) potassium chlorate,
(11) sodium chlorate,
(12) 3,6-endoxohexahydrophthalic acid and its disodium salt,
(13) 1,1'-ethylene-2,2'-dipyridylium dibromide,
(14) 1,1'-dimethyl-4,4'-dipyridylium dichloride,
(15) N'-(4-chlorophenyl)-N,N-dimethylurea,
(16) N'-(3,4-dichlorophenyl)-N,N-dimethylurea,
(17) 2-chloro-4-ethylamino-6-isopropylamino-1,3,5-triazine,
(18) alkali and amine salts and esters of 2,4-dichlorophenoxyacetic acid, and
(19) sodium pentachlorophenate, wherein said hydrotrope is at least one alkali metal salt of a phenoxypolyethoxyethyl phosphoric acid of the formula R-phenyl$(CH_2CH_2O)_x$phosphate wherein R is selected from the group consisting of hydrogen and alkyl groups of 1 to 12 carbon atoms and $x$ is a number 1 to 20, and wherein said surfactant is selected from the group consisting of (1) octyl- and nonyl-phenoxypolyethoxyethanol having a total of 6 to 20 ethoxy units,
(2) alkali metal salts of octylphenoxyethyl sulfate and of octylphenoxypolyethoxyethyl sulfates having a total of 2 to 6 ethoxy units,
(3) water-soluble salts of alkylbenzenesulfonic acid wherein the alkyl group constains 8 to 16 carbon atoms, and
(4) alkali metal salts of 1-β-(carboxymethoxy)ethyl-1-carboxymethyl-2-undecyl-2-imidazolinium hydroxide.

2. A herbicidal composition according to claim 1 wherein the hydrotrope-surfactant combination is present in the amount of one pint to eight pints and wherein the volume ratio of hydrotrope to surfactant is in the range of 6:1 to 1:4.

3. A herbicidal composition according to claim 1 wherein the said herbicide is monosodium methanearsonate, the said hydrotrope is dipotassium cresoxytetraethoxyethyl phosphate, and the said surfactant is an octylphenoxypolyethoxyethanol having a total of 6 to 20 ethoxy units.

4. A herbicidal composition according to claim 1 wherein the said herbicide is sodium arsenite, the said hydrotrope is dipotassium cresoxytetraethoxyethyl phosphate and the said surfactant is an octylphenoxypolyethoxyethanol having a total of 6 to 20 ethoxy units.

5. A herbicidal composition according to claim 1 wherein the said herbicide is 2,2-dichloropropionic acid, the said hydrotrope is dipotassium cresoxytetraethoxyethyl phosphate, and the said surfactant is an octylphenoxypolyethoxyethanol having a total of 6 to 20 ethoxy units.

6. A herbicidal composition according to claim 1 wherein the said herbicide is 1,1'-dimethyl-4,4'-dipyridylium dichloride, the said hydrotrope is dipotassium cresoxytetraethoxyethyl phosphate, and the said surfactant is an octylphenoxypolyethoxyethanol having a total of 6 to 20 ethoxy units.

7. A herbicidal composition according to claim 1 wherein the said herbicide is 3-(3,4-dichlorophenyl)-1,1-dimethylurea, the said hydrotrope is dipotassium cresoxytetraethoxyethyl phosphate, and the said surfactant is an octylphenoxypolyethoxyethanol having a total of 6 to 20 ethoxy units.

8. A method for the control of weeds which comprises applying to the locus to be controlled a herbicidal composition comprising a herbicide present in an amount per acre to achieve a desired control of weeds, in combination with a hydrotrope and a surfactant wherein the hydrotrope-surfactant combination is present in the amount of one half pint to twenty pints and in which the volume ratio of hydrotrope to surfactant is in the range of 10.1 to 1:10, wherein said herbicide is selected from the group consisting of (1) monosodium methanearsonate,
(2) disodium methanearsonate,
(3) sodium arsenate,
(4) sodium arsenite,
(5) 2,2-dichloropropionic acid and its alkali metal salts,
(6) trichloroacetic acid and its alkali metal salts,
(7) 2,2,3-trichloropropionic acid and its alkali metal salts,
(8) 2,3-dichloroisobutyric acid and its alkali metal salts,
(9) magnesium chlorate,
(10) potassium chlorate,
(11) sodium chlorate,
(12) 3,6-endoxohexahydrophthalic acid and its disodium salt,
(13) 1,1'-ethylene-2,2'-dipyridylium dibromide,
(14) 1,1'-dimethyl-4,4'-dipyridylium dichloride,
(15) N'-(4-chlorophenyl)-N,N-dimethylurea,
(16) N'-(3,4-dichlorophenyl)-N,N-dimethylurea,
(17) 2-chloro-4-ethylamino-6-isopropylamino-1,3,5-triazine,
(18) alkali and amine salts and esters of 2,4-dichlorophenoxyacetic acid, and
(19) sodium pentachlorophenate, wherein said hydrotrope is at least one alkali metal salt of a phenoxypolyethoxyethyl phosphoric acid of the formula R-phenyl$(CH_2CH_2O)_x$phosphate wherein R is selected from the group consisting of hydrogen and alkyl groups of 1 to 12 carbon atoms and $x$ is a number 1 to 20, and wherein said surfactant is selected from the group consisting of (1) octyl- and nonyl-phenoxypolyethoxyethanol having a total of 6 to 20 ethoxy units,
(2) alkali metal salts of octylphenoxyethyl sulfate and of octylphenoxypolyethoxyethyl sulfates having a total of 2 to 6 ethoxy units,
(3) water-soluble salts of alkylbenzenesulfonic acid wherein the alkyl group contains 8 to 16 carbon atoms, and
(4) alkali metal salts of 1-β-(carboxymethoxy)ethyl-1-carboxymethyl-2-undecyl-2-imidazolinium hydroxide.

9. A method according to claim 8 wherein the hydrotrope-surfactant combination is present in the amount of one pint to eight pints and wherein the volume ratio of hydrotrope to surfactant is in the range of 6:1 to 1:4.

10. A method according to claim 8 wherein the said herbicide is monosodium methanearsonate, the said hydrotrope is dipotassium cresoxytetraethoxyethyl phosphate, and the said surfactant is an octylphenoxypolyethoxyethanol having a total of 6 to 20 ethoxy units.

11. A method according to claim 8 wherein the said herbicide is sodium arsenite, the said hydrotrope is dipotassium cresoxytetraethoxyethyl phosphate and the said surfactant is an octylphenoxypolyethoxyethanol having a total of 6 to 20 ethoxy units.

12. A method according to claim 8 wherein the said herbicide is 2,2-dichloropropionic acid, the said hydrotrope is dipotassium cresoxytetraethoxyethyl phosphate, and the said surfactant is an octylphenoxypolyethoxyethanol having a total of 6 to 20 ethoxy units.

13. A method according to claim 8 wherein the said herbicide is 1,1'-dimethyl-4,4'-dipyridylium dichloride, the said hydrotrope is dipotassium cresoxytetraethoxyethyl phosphate, and the said surfactant is an octylphenoxypolyethoxyethanol having a total of 6 to 20 ethoxy units.

14. A method according to claim 8 wherein the said herbicide is 3-(3,4-dichlorophenyl)-1,1-dimethylurea, the said hydrotrope is dipotassium cresoxytetraethoxyethyl phosphate, and the said surfactant is an octylphenoxypolyethoxyethanol having a total of 6 to 20 ethoxy units.

References Cited by the Examiner

UNITED STATES PATENTS

| | | | |
|---|---|---|---|
| 3,004,056 | 10/1961 | Nunn. | |
| 3,143,407 | 8/1964 | Mitchell et al. | 71—2.6 XR |
| 3,154,398 | 10/1964 | McRae | 71—2.6 |
| 3,169,850 | 2/1965 | Thompson | 71—2.6 |

ELBERT L. ROBERTS, *Primary Examiner.*

JAMES O. THOMAS, Jr., LEWIS GOTTS, *Examiners.*

A. J. ADAMCIK, *Assistant Examiner.*